G. Fisher,
Riding Saddle,
N° 7,507.  Patented July 16, 1850.
Fig. 1.
Fig. 2.
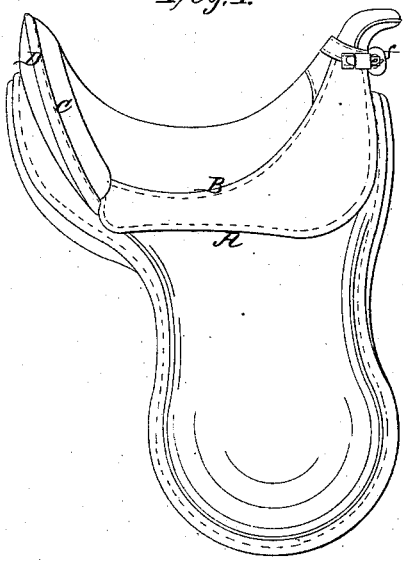
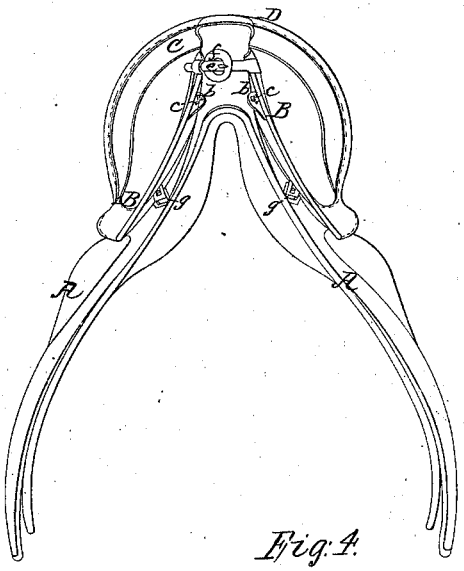
Fig. 3.
Fig. 4.
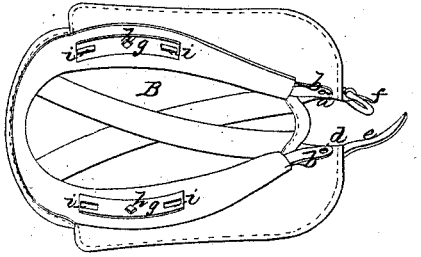
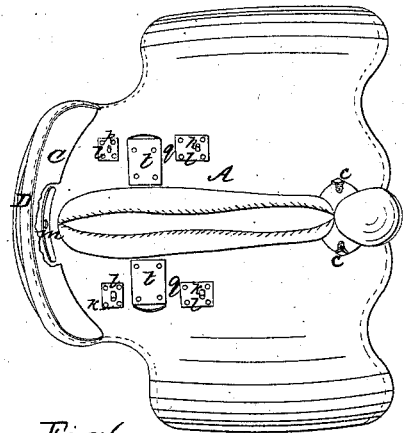
Fig. 5.
Fig. 6.

UNITED STATES PATENT OFFICE.

GEO. FISHER, OF RALEIGH, NORTH CAROLINA.

SPRING-SADDLE.

Specification of Letters Patent No. 7,507, dated July 16, 1850.

*To all whom it may concern:*

Be it known that I, GEORGE FISHER, of Raleigh, in the county of Wake and State of North Carolina, have invented certain new and useful Improvements in a Saddle, which I term an "Adjustable Spring-Saddle;" and I do hereby declare that the following is a full, clear, and exact description thereof, reference being had to the accompanying drawings, forming a part of this specification, in which—

Figure 1, is a side view. Fig. 2, is a front view. Fig. 3, is a view of the under side of the movable seat, detached from the saddle. Fig. 4, is a top view of the saddle, the movable seat being removed. Fig. 5, is a detached view of a spiral spring. Fig. 6, is a detached view of an elliptic spring.

Similar letters of reference indicate corresponding parts in each of the several figures.

The nature of my invention, consists in making the seat part of the saddle movable, and applying springs beneath it, for the purpose of affording ease in riding. These springs may be of any suitable strength to suit the weight of the rider, and each saddle may be provided with two or more sets of springs of various forms and strength.

To enable others skilled in the art to make and use my invention, I will proceed to describe its construction and effect.

A, represents the body of the saddle, which is mounted upon a tree in the usual manner.

B, is the movable seat, which is constructed upon a steel frame, the ends of which ($b$, $b$,) are seen in Figs. 2 and 3.

The seat is attached to the saddle in the following manner: The back part of the seat fits under a flap or apron of leather C, attached to the cantle D, of the saddle; the ends of the frame $b$, $b$, are secured to the saddle tree, by small screw bolts $c$, $c$, which pass through holes $d$, $d$, and are screwed into the tree; a strap $e$, and a buckle $f$, are attached to the front of the seat, for the purpose of securing it to the head of the saddle.

$g$, $g$, are sliding arched springs, secured by screws $h$, $h$, to the frame of the seat, the springs are provided with slots $i$, $i$, which fit on pins $k$, $k$, attached to plates $l$, $l$, which are attached to the saddle tree; these pins $k$, $k$, are for the purpose of keeping the springs $g$, $g$, in place, and the plates $l$, $l$, form bearings for the ends of the springs; the springs may be of any required strength, to bear the weight of the rider. $m$, is an inverted arched spring, attached to the cantle of the saddle, its ends bear under the back of the seat, and prevent it falling back too far.

$t$, $t$, are plates attached to the top of the saddle tree forming bearings when elliptic springs are used.

The springs $g$, $g$, and $m$, form an elastic bearing for the seat B, and when the weight of the rider is upon the saddle, allow the seat to yield to the motion of the horse, and prevent jolting, which is frequently the cause of serious injury to the rider. Various other forms of springs may be used, as a spiral spring $n$, Fig. 5, it is riveted at the upper end to a small plate of metal $o$, provided with a small hole $p$, in its center; the plate $o$, may be secured to the under side of the seat, by the screw $h$, on either side, and the lower end of the spring is provided with a sharp point, which may be inserted in a hole $q$, on either side of the saddle tree.

$r$, Fig. 6, is an elliptic spring, which is provided with a hole $s$, and may be secured by the screw $h$, on either side, the lower part of the spring would rest on one of the plates $t$, $t$, attached to the saddle tree. The effect of the springs $n$, or $r$, would be precisely similar to that of the springs $g$, $g$. Stronger or weaker springs may be quickly put in, by removing the seat B, and taking out the screws $h$, $h$. This movable seat B, and the springs are applicable to any saddle either with or without a horn or to a lady's saddle.

Having described my invention, I will now state what I claim as new in my invention and desire to secure by Letters Patent—

I claim the springs $g$, $g$, or springs of any other form producing the same effect, placed between the movable seat B, and the body of the saddle A, in such a manner as to be easily taken out, and changed as herein described.

GEORGE FISHER.

Witnesses:
RUFUS H. PAGE,
JOHN G. WILLIAMS.